(12) United States Patent  (10) Patent No.: US 9,190,848 B2
Collie  (45) Date of Patent: Nov. 17, 2015

(54) PARALLEL LINKAGE FOR GENERATORS

(71) Applicant: Champion Power Equipment, Santa Fe Springs, CA (US)

(72) Inventor: Kendall J. Collie, Santa Fe Springs, CA (US)

(73) Assignee: Champion Power Equipment, Inc., Sante Fe Springs, CA (US)

( * ) Notice: Subject to any disclaimer, the term of this patent is extended or adjusted under 35 U.S.C. 154(b) by 427 days.

(21) Appl. No.: 13/829,092

(22) Filed: Mar. 14, 2013

(65) Prior Publication Data

US 2013/0293023 A1  Nov. 7, 2013

Related U.S. Application Data

(60) Provisional application No. 61/640,603, filed on Apr. 30, 2012.

(51) Int. Cl.
*H02J 3/46* (2006.01)
*H02J 3/40* (2006.01)

(52) U.S. Cl.
CPC ... *H02J 3/46* (2013.01); *H02J 3/40* (2013.01); *Y10T 307/718* (2015.04); *Y10T 307/735* (2015.04)

(58) Field of Classification Search
None
See application file for complete search history.

(56) References Cited

U.S. PATENT DOCUMENTS

| | | | |
|---|---|---|---|
| 5,258,700 A | 11/1993 | Shimizu et al. | |
| 2010/0007207 A1* | 1/2010 | Peuser | 307/10.1 |
| 2011/0242769 A1* | 10/2011 | Trine et al. | 361/728 |

FOREIGN PATENT DOCUMENTS

| | | | |
|---|---|---|---|
| JP | 56129832 A | 10/1981 | |
| JP | 6351836 A | 3/1988 | |

OTHER PUBLICATIONS

Eric Trine and Daniel Boone, Parallel Operation Kit, Brochure, Jun. 23, 2010, pp. 1-3, Champion Power Equipment.
Eric Trine and Daniel Boone, Portable Inverter Generator, Owner Manual & Operating Instructions, Jun. 10, 2010, pp. 1-26, Champion Power Equipment.

* cited by examiner

*Primary Examiner* — Rexford Barnie
*Assistant Examiner* — Terrence Willoughby
(74) *Attorney, Agent, or Firm* — Stetina Brunda Garred & Brucker; Lowell Anderson

(57) ABSTRACT

Three or more portable generators are linked for synchronized operation. Power cables link each generator to a linkage box which connects the power in parallel and connects an outlet thereto. Communication cables link a software module in each generator with the linkage box. The modules vary the generator operation to generate a voltage amplitude and phase matching that of the first generator that is connected to the box that begins power generation, so that all generators share the load equally until their power output limits are reached.

7 Claims, 3 Drawing Sheets

PARALLEL LINKAGE FOR GENERATORS

CROSS-REFERENCE TO RELATED APPLICATIONS

This Application claims the benefit under 35 U.S.C. 119(e) to Provisional Patent Application No. 61/640,603 filed Apr. 30, 2012, the entire contents of which are incorporated herein by reference.

STATEMENT RE: FEDERALLY SPONSORED RESEARCH/DEVELOPMENT

Not Applicable

BACKGROUND

This invention relates to a portable, engine driven generators, and more particularly to a portable generator which automatically adapts itself to parallel operation of three or more portable generators connected in parallel with each other by automatically synchronizing the phases of outputs of the generators.

Because of manufacturing and operational inconsistencies, each portable, engine driven generator produces electricity at a slightly different voltage and frequency and with a different phase between the voltage and current. When two or more portable generators are connected in parallel with each other in operation, then if the phases or amplitudes of the output voltages from the generators are not synchronous, it will causes electric current to flow from one generator into another generator, which can result in the damage of component parts of one or more of the generators. Therefore, it is desirable to synchronize the phases and amplitudes of the output voltages from each of the joined generators.

To this end, even in the case of parallel operation of identically-constructed portable generators, the prior art has provided ways to try and synchronize generators. For example, U.S. Pat. No. 5,258,700 generates a target output sine waveform with a frequency based on phase differences among the joined generators and uses the switching control of the inverters adjust each generator's output to match the target signal. This patent also refers to Japanese Patent Publication (Kokoku) No. 56-20782 which uses an automatic synchronizing device and means for producing an operating point at which the electrical phases of two plural generators coincide with each other in order to cause the automatic synchronizing device to operate promptly and reliably. U.S. Pat. No. 5,258,700 also refers to Japanese Provisional Utility Model Publication (Kokai) No. 62-145440 uses a special adaptor for parallel operation of two portable generators, with one of them serving as a master generator while the other serves as a slave generator.

BRIEF SUMMARY

The synchronization method and apparatus disclosed herein uses a communication cable to let software within modules in each generator see or determine the timing difference between two waveforms, one of which is a master generator waveform and the other of which is the slave generator waveform. The slave generator's waveform is then adjusted or timed in order to line up with the master's signal. The software decides which of the generators is the master and which is the slave and does so upon startup, with later joined generators becoming slave generators synchronized to the master generator. The synchronization is achieved through a communication cable, but may be implemented by wireless communications although at greater complexity and cost.

The software module obtains synchronized operation by comparing the phase difference between a voltage signal and a current signal and an output control signal from the master generator in order to adjust an oscillator in each slave generator to change the frequency of output, which in turn reduces the phase difference and thereby achieve parallel operation. The linked generators are thus not on an equal status. A first generator is a primary (master) generator and the second, third or additional generators are controlled generators or slave generators. The generators are preferably connected before starting, with the generator that is started first being assigned the master generator and subsequent generators being slaved to that master generator.

Thus, three or more portable generators are linked for synchronized operation. Power cables link each generator to a linkage box which connects the power in parallel and connects an outlet thereto. Communication cables link a software module in each generator with the linkage box. The modules vary the generator operation to generate a voltage amplitude and phase matching that of the first generator that is connected to the box that begins power generation, so that all generators share the load equally until their power output limits are reached.

In more detail, there is provided a system of linked, portable generators for synchronized operation. The system includes at least first, second and third portable, engine driven, inverter generators. Each generator a separate control module configured to vary the amplitude of the generated voltage and the phase between the generated current and voltage. The system also includes a linkage box connected to the at least first, second and third generators to receive power output from those generators and to connect those power outputs in parallel. The linkage box has at least one receptacle (power outlet) in electrical communication with the power output of the linked generators. The system also includes a communication cable extending between and separately linking the linkage box to each of the at least first, second and third generators and the control module associated with each of those generators so as to place the control modules in communication with the linkage box and with at least the control module of the first generator which outputs the amplitude and phase of the power output of the first generator. The control modules of the at least second and third generators are configured to synchronize the operation of the generator associated with the control module to the operation of the first generator so as to generate an AC output with a voltage amplitude and phase like that of the first generator.

In further variations, the system has only three generators and three communication cables with the communication cables interconnected, preferably in parallel, by the linkage box. Alternatively, the system may have only four generators and four communication cables with the communication cables interconnected, preferably in parallel, by the linkage box. The outlet on the linkage box has an amperage greater than that of any outlet on any of the linked generators. The linked generators may different maximum power outputs.

There is also advantageously provided a method for synchronizing three or more (first, second and third) portable, engine powered, inverter generators. The generators each have a separate control module configured to vary the amplitude of the generated voltage and the phase between the generated current and voltage. The method comprises connecting a power output of each generator to a linkage box which connects the power outputs in parallel and placing an electrical outlet on the linkage box in electrical connection with the parallel power output of the linked generators. The method also includes placing the control module of each generator in communication with the linkage box and with at least the control module in a first started generator which outputs a signal relating to the voltage and phase of the power output of that first started generator. The method also includes configuring the control modules of the at least second and third generators to synchronize the operation of the generator associated with those control modules to the operation of the first started generator in response to signals provided by the first control module, so that each at least second and third generators generate an AC output with a voltage amplitude and phase like that of the first generator.

In further variations, the method also includes linking or connecting generators at least one of which has a different maximum power output than the other generators.

There is also provided a linkage box for synchronizing the operation of three or more portable, engine powered, inverter generators. Each generator has a control module in electrical communication with a communication connector on the generator. The linkage box includes a portable housing with at least three power input connectors each configured to receive the power input from a portable generator. The housing contains circuitry that places the at least three power input connectors in parallel. The housing also has at least one electrical outlet in electrical communication with the parallel power output from the at least three power input connectors. The housing further has at least three communication connectors each configured to receive control signals from and transmit control signals to the communication connector on one of the generators during use.

In one variation, the housing contains circuitry connecting the communication connectors in parallel. In another variation there are only three power input connectors and three communication input connectors. In a further variation there are only four power input connectors and four communication input connectors.

There is also disclosed a kit for linking portable, engine powered, inverter generators. The kit include a linkage box as described above and at least three power transfer cables, each of which has a first end configured to connect to the power output of an electrical generator and a second end configured to connect to the power input connector on the linkage box. The power transfer cables are further configured to conduct at least 120 volt AC power, at least at 25 amps, through the power transfer cables. The kit also includes at least three communications cables where each cable has a first end configured to connect to the communication connector on the linkage box and has a second end configured to connect to a generator so as to place the linkage box in electrical communication with a control module of the generator during use.

In further variations, the kit includes only three or only four power transfer cables and the matching number of communication cables. In an additional variation, the at least one power outlet in the housing has an amperage of at least 50 amps. In a still further variation, the housing has circuitry connecting the communication connectors in parallel.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
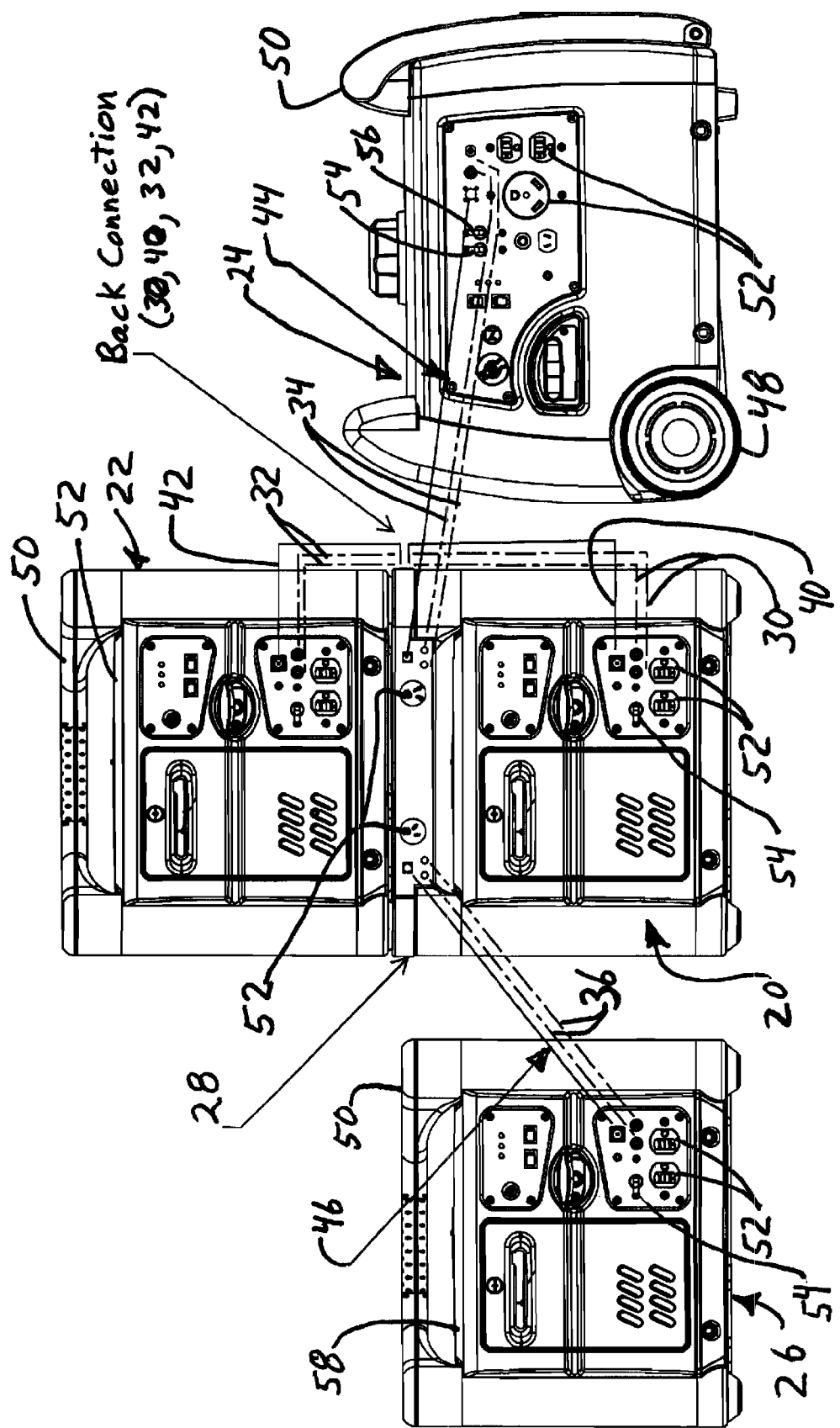
FIG. 1 is a plan view of four generators connected in parallel for synchronized control between two generators, the figure showing a linkage box having two sets of connections on the front with two similar connections on the opposing side (not shown)

Referring to FIG. 1, first, second, third and fourth generators 20, 22, 24 and 26, respectively, and a parallel connector box 28 are connected as shown, using first, second, third and fourth pairs of power cables 30, 32, 34 and 36 respectively, and communication cables 40, 42, 44 and 46, respectively. FIG. 1 shows the connections on the front side of the linkage or connector box 28, with the back side having a similar configuration (but with power outlets being optional on the back side). Thus, power cable 30 and communication cable 40 connect the first generator 20 to the connector box 28, preferably to a second side or back of the box. Power cable 32 and communication cable 42 connect the second generator 22 to the connector box 28, preferably to the second side or back of the box. Power cable 34 and communication cable 44 connect the third generator 24 to the connector box 28, preferably to a first or front side of the box. Power cable 36 and communication cable 46 connect the fourth generator 26 to the connector box 28, preferably to the first or front side of the box.

The power cables 30, 32, 34 and 36 are preferably paired power cables for transmitting 120 volts AC, with removable plug connectors (preferably male connectors) configured to releasably engage mating connectors on the generators (preferably female connectors). The communication cables 40, 42, 44, 46 are preferably shielded cables with removable plug connectors configured to releasably engage mating connectors on the generators and box 28. Four pin male and female connectors are believed suitable for the communications cables.

The generators 20, 22, 24, 26 are combustion engine driven, portable generators producing AC power. The wattage output of each generator may vary with operational speed of the engine and alternator, with generators of 1000, 2000, 3000, 5000 and 6,500 watts each being currently available. In the illustrated embodiment of FIG. 1, Generators 20, 22 and 26 are 1000 watt inverter generators, while the third generator 14 is a 3,000 watt inverter generator with wheels 48 to facilitate movement of the larger generator. Each generator preferably, but optionally, has a handle 50 to facilitate movement, and may have optional wheels 48. Each generator has power outlets or receptacles 52, on-off switches 54, starter switches or pull-cords (not marked), fuel tanks 58, engines, mufflers and other controls, connectors and components found on such portable generators.

Figure 2:
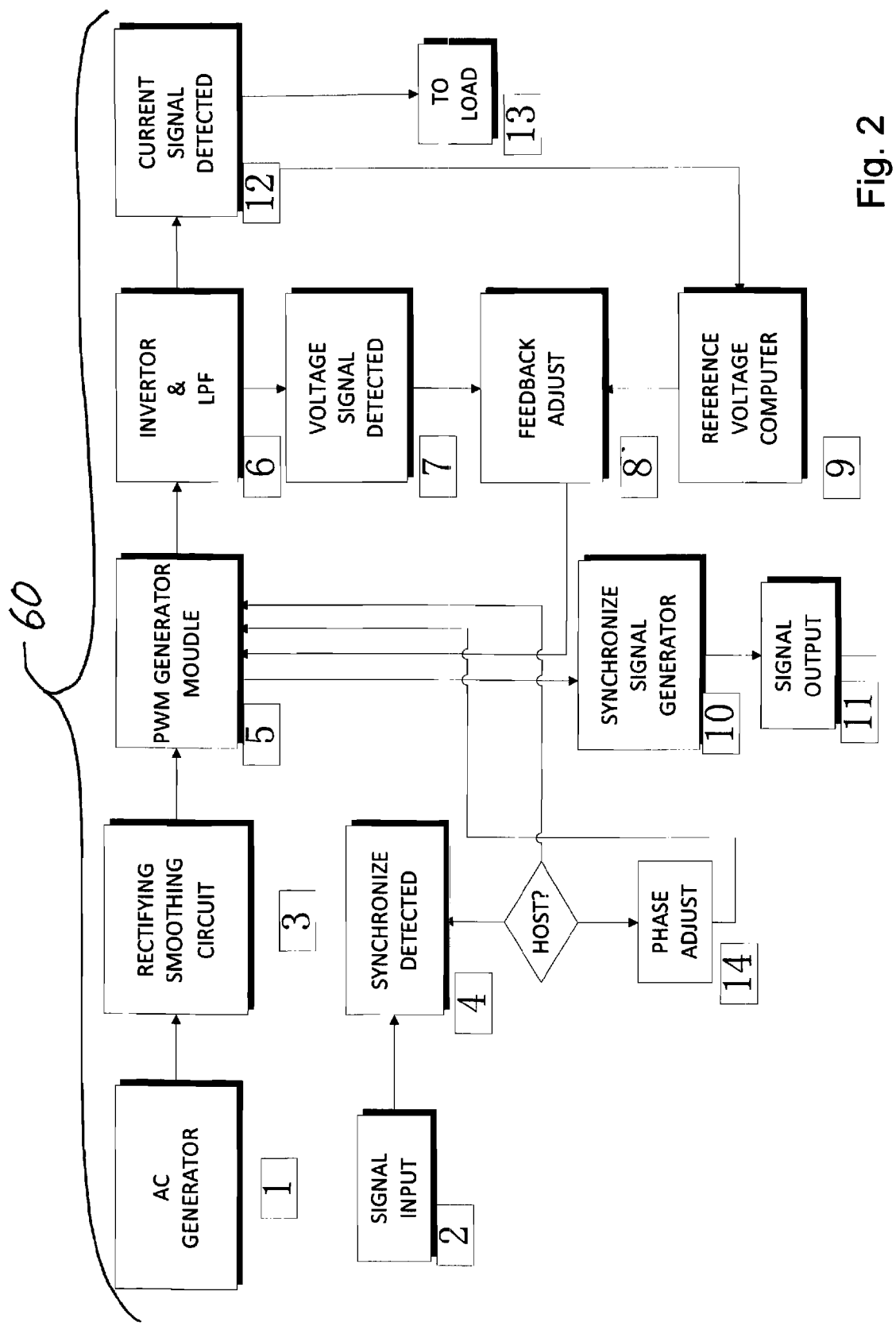
FIG. 2 is a block diagram of a software control module and the steps implemented or monitored therein.

Referring further to FIG. 2, within each generator 20, 22, 24 and 26, the engine rotates an alternator that generates an AC current of variably frequency and voltage depending on engine operation of the particular generator. This is represented schematically in block 1 of FIG. 2. That AC current is rectified to direct current and smoothed, as reflected in block 3 of FIG. 2. An inverter converts the DC into a more uniform AC current and a low pass filter (LPF) remove high frequency noise from the AC current, as reflected in block 6 of FIG. 2. The AC voltage signal (Block 7) and current signal (block 12) are monitored compared to a reference voltage (block 9) to decide if any adjustment should be made in the feedback adjustment block 8, with the output of the feedback block 8 provided to the PWM generator module 5. The PWM generator module of block 5 adjusts the frequency, amplitude and phase of the AC output of the inverter block 6 to produce a 60 HZ AC, 120V output. This basic sequence is controlled by software module 60 (FIG. 3), located in each generator 20, 22, 24, 26.

Figure 3:
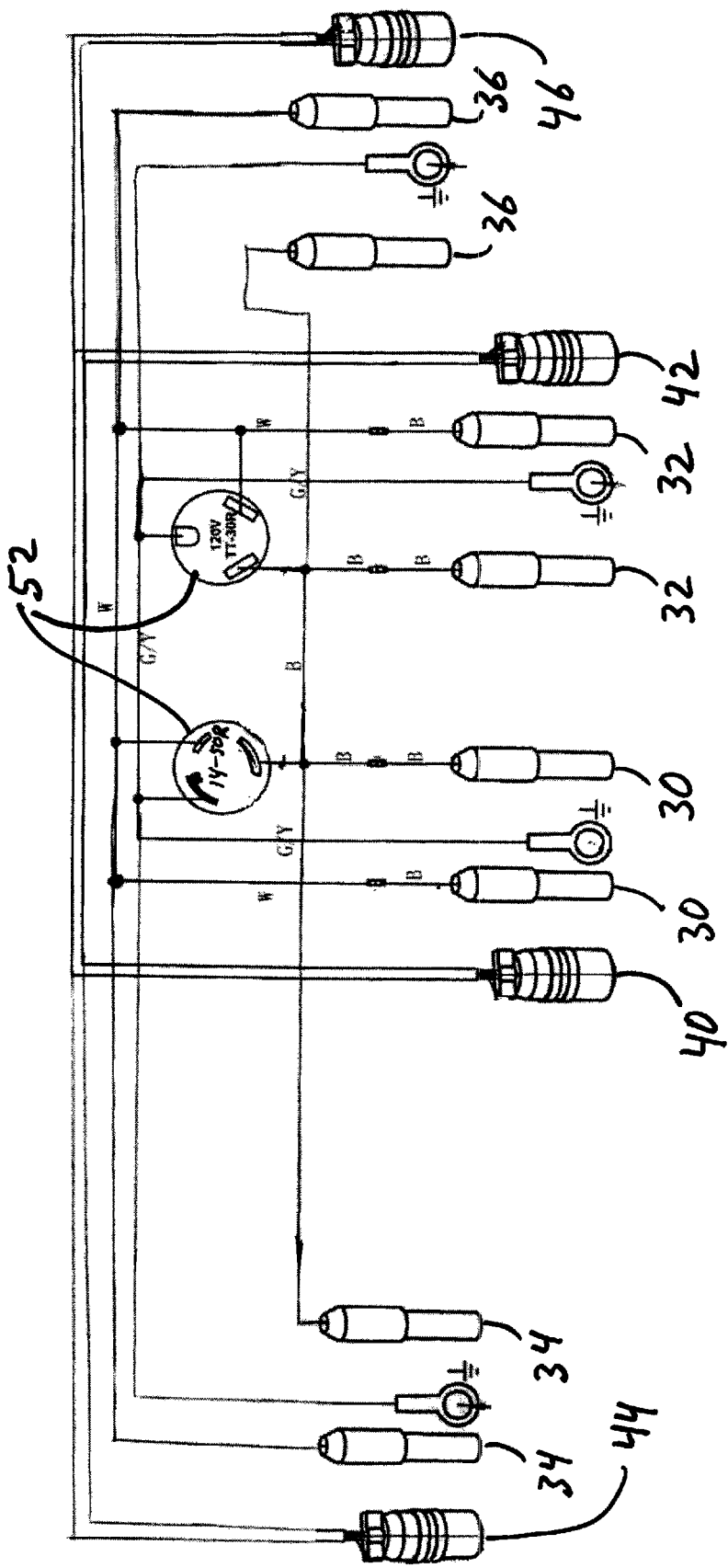
FIG. 3 is a schematic diagram of a linkage box for linking the generators of FIG. 1.

Referring to FIGS. 1-3, each generator 20, 22, 24, 26 has software control module 60 and sufficient control circuitry to implement the software functions as generally shown in FIG. 2. Preferably the functions are controlled by the software module 60 and implemented by firmware, integrated circuits, wired connections, mechanical linkages, stepper motors, etc. Upon starting three or four of the generators 20, 22, 24 and 26 are connected to the linkage box 28 through power cables and communication cables as described above. One generator is started first, before the others, and for illustration generator 20 is started first. As the first started generator 20 it becomes the primary or master generator and is identified or detected as such by signals transmitted over communication cables 30, 32, 34 and 36. The other generators are started later and the starting sequence does not matter.

Upon starting the first generator 20, as reflected by block 3 in FIG. 2, the three-phase current produced by the generator 20 is rectified and smoothed. The rectified and smoothed current is supplied to a pulse width modulator (PWM) generator module 5 which generates a signal that is pulse width modulated, with the rectified and smoothed current thereafter supplied to an inverter circuit and low pass filter (LPF) 6 that generate 120 volts AC. The rectified and smoothed DC current is provided to the inverter and LPF 6 only after determining whether the generator is a master (primary) generator, or a (secondary) generator.

As the generator 20 is started 1, software module 60 checks for an input signal (block 2) used to synchronize the generators and since the generator 20 is the first generator started, detects no signal and identifies generator 20 as the master or primary generator, for which no synchronization (block 4) or phase adjustment (block 14) is needed. Thus, if the generator is the master generator then there is no signal input 2 from one of the communication cables 40, 42, 44, 46 and the synchronization detection check 4 is bypassed and the phase adjustment 14 is bypassed.

In contrast, if the generator were a slave generator then communication cables 40, 42, 44, 46 would provide a signal input 2 from the master generator and block 4 would check the input signal 2 to see if the generated current is synchronized. The host query block bypasses the phase adjustment block 14 if the module determines it is the host generator, but adjusts the phase if an input signal 2 is provided that is not determined to be synchronized in block 4. Thus, simultaneously with starting the generator, the module 60 detects the input signal 2 from the communication line (40, 42, 44, 46) to differentiate whether the generator is the primary (master) generator or a secondary (slave) generator and proceeds accordingly as the master or slave generator.

Returning to the illustrative operation of the master generator 20, having confirmed the generator 20 is the master generator the rectified and smoothed DC current is inverted and filtered in block 6, monitored to determine the current in block 12 and passed to the load in block 13. The inverter and filter block 6 also provides a feedback loop that includes blocks 7, 8, 9 12 and 5. The inverter voltage from block 6 is monitored in block 7 and adjusted in feedback adjustment block 8. The feedback adjustment block receives information on the current at block 12 from the current of the AC provided to load, and also receives a reference voltage, with the adjustment 8 varying the inverter and filter (block 6) and the engine operation to achieve the desired AC profile, as controlled by software module 60.

If the generator's module 60 identifies the generator 20 as the primary (master) generator, then PWM module 5 sends information on the current being generated by primary generator 20 to the synchronization signal generator 20 which generates a signal output 11 that is representative of the phase of the generated power current of the generator, here the primary (master) generator 20. The signal output 11 (and signal input 2) is transmitted over communication cables 40, 42, 44 and 46 to the other generators, through the parallel linkage box 28 so that the other generators can match the voltage phase represented by that signal. The output signal 11 represents the phase between voltage and current, and is preferably based off of the catenary of the sine wave for the generated AC power as a reference (block 9). The catenary or sagging curve represents the portion of the sine wave below the horizontal axis. Therefore, the module 60 in each generator 20, 22, 24, 26 can achieve an equal share of power between the generators connected in parallel operation and can then reduce circular flow of excess power so as to reduce damage to the generator and its components.

If the generator's module 60 identifies the generator as not being the primary (master) generator (e.g., generator 22, 24, 26), then the generator is identified as a slave or secondary generator and its operation is adjusted to produce an AC output with the same phase as the master generator 20. For a slave generator, before output of the generated current to the Inverter/LPF block 6 or concurrently therewith, the software module 60 will first track the phase between the generated current and voltage of the generator 22, 24, 26 associated with the particular module 60, and compare that phase with the phase of the primary generator 20 (via signal output 11) which is received as an input signal in signal block 2, and then adjust the generator to generate the same waveform of the phase of the voltage as that of the primary (master) generator 20. After several rounds of comparison to be assured its accuracy, the module 60 will then drive the PWM-driven circuit 5 to output the current to the Inverter/LPFF module 6 and to the load 13, while simultaneously monitoring the current and voltage of the rectified AC output (blocks 6-9 and 12) and comparing it with a reference voltage 9 (as from stored memory, processor or computer). For a slave generator, the reference voltage is set as the voltage and phase of the output signal 11 from the master generator 20.

As the load on the generators varies, the signal output 11 from the master may change and thus the phase adjustment 14 may continually vary and the reference voltage 9 will alter, and the feedback adjustment of blocks 7,8, 9 and 12 will vary to alter the generator performance so it produces an AC voltage in phase with that of the master generator 20

Thus, for slave generators, the input signal 2 is used to identify the generator as a slave and synchronization is checked in block 4 while appropriate any phase adjustments are determined in block 14, with the resulting input provided to PWM generator 5 that also receives input from the generated AC output. Through sequential use of the feedback loop using steps or blocks 5, 6, 7, 8 9 and 12, a stabilized voltage output conforming to that of the master generator 20 is achieved. Thus, the module 60 can control rectifying the waveform at fixed period and maintain a smooth parallel operation of the linked generators.

Thus, when the load 13 is an inductive load or a capacitive load, because of the existence of the synchronous communication lines 30, 32, 34, 36, the voltages and the currents of the connected generators (20, 22, 24, 26) will maintain the same advanced or retarded phase based on the phase of the primary generator 20.

The software module 60 thus uses a feedback control represented by blocks 9, 10, 11 and 12 in FIG. 2 in order to maintain a stable voltage conforming to reference voltage 9, despite fluctuations in the operation of generators 20, 22, 24, 26. When the input signal 2 changes, the reference voltage 9 also changes in order to continually track the operation of the master generator 20. The module 60 of the primary generator 20 preferably uses the voltage catenary (or sagging curve) generated by the output power as a reference for synchronization of performance.

Basically, the software module 60 in each slave generator 22, 24, 26 tries to keep its output power amplitude and phase synchronized with the power amplitude and phase of the primary generator, as represented by the signal output 11 from the primary generator and signal input 2 of the slave generators, which are communicated from the master generator 20 through communication cables 40, 42, 44 and 46 to the various generators connected to the respective cable. The linkage box 28 and cables 40, 42, 44 and 46 allow the generator associated with a particular module 60 within that generator to synchronize operation and adjustment of the generator to the phase and power amplitude of the master generator 20. Thus, the linkage box 28 has four connectors for the communication cables 30, 32, 34 and 36, has connectors for four power cables 20, 22, 24 and 26, and has at least one power outlet 52. Advantageously, the linkage box 28 has at least one power outlet 52 of greater than 30 amps, and preferably has at least one and preferably two or more outlets of 50 amps. At least one outlet 52 of 30 amps may also be provided, and preferable, 2, 3, 4 or more 30 amp outlets are optionally provided in the linkage box 28.

In addition to having connections for the power cables and communication cables, the linkage box 28 also advantageously has one or more receptacles 52, including one or more higher amperage receptacles than are normally available on the portable generators 20, 22, 24 and 26. Advantageously, the linkage box 28 has at least one 50 amp outlet or receptacle 52, whereas most generators have 30 amp receptacles, or lower. Further, the linkage box 28 may also have a circuit breaker, with software breakers being usable, but with an external thermal breaker being preferred. The thermal breaker is believed to more readily accommodate transient current fluctuations without tripping the breaker, as might arise if the generators are connected to a recreational vehicle (RV) that turns on its air conditioner.

This parallel linkage of the generators is especially useful for engine powered, inverter generators because each such generator typically has a software module that monitors the amperage of the output power or load, and has a look-up table providing a preferred engine speed for each such load or output power, and adjusts the engine speed according to the speed specified in the lookup table. Typically a stepper motor is controlled by a processor in electrical communication with the load sensor and look-up table. This allows inverter generators to run at whatever speed is needed to meet the load and thus reduce noise conserve fuel as compared to synchronous motor generators which operate the engine at a constant speed that is usually a multiple of (and hence synchronized to) the output frequency of the generated power, resulting in high and motor speeds such as 3,600 rpm for a 60 Hz output frequency.

In operation, three or four (preferably inverter) generators 20, 22, 24 and 26 are connected to the linkage box 28, through power cables 30, 32, 34 and 36, and through communication cables 40, 42, 44 and 46. With these power and communication cables connected one generator is started, preferably generator 20, and allowed to stabilize in that the engine runs smoothly and produces a suitably constant voltage to at least one power outlet 52 on the generator and/or on linkage box 28, preferably but optionally in a no-load condition. The software module 60 in the first generator identifies the generator 20 as the master generator and will identify all later generators as slave generators. Once the first, master generator 20 is stabilized the second generator 22 is started and allowed to stabilize. The software module 60 in the second generator 22 identifies that generator as a slave generator and using the steps or blocks of FIG. 2 will synchronize the operation of the second generator 22 to the operation of the master generator 20. After the first and second generators are stabilized and preferably after they are synchronized the third generator 24 is started and allowed to stabilize. The software module 60 in the third generator 24 identifies that generator as a slave generator and using the steps of blocks of FIG. 2 will synchronize the operation of the third generator to the operation of the master generator 20. If desired, after the first, second and third generators 20, 22 and 24 are stabilized and preferably after they are synchronized the fourth generator 26 is started and allowed to stabilize. The software module 60 in the fourth generator 26 identifies that generator as a slave generator and using the steps of blocks of FIG. 2 will synchronize the operation of the fourth generator to the operation of the master generator 20. The synchronization is audibly determinable as the engines will vary speed slightly during the synchronization process and after a period of several seconds will assume a smooth running state reflecting synchronization. After the generators are synchronized and stabilized the load is applied to the interconnected or linked generators. Applying the load before all generators are synchronized makes synchronization difficult and may prevent synchronization.

Each generator 20, 22, 24, 26 provides power to the outlet(s) 52 on linkage box 28, in parallel, thereby allowing the use of higher amperage outlets 52 than are available on any one of the linked generators individually As the load varies, the engine on the master generator will vary its speed, increasing speed to produce more power and reducing speed to produce less power and as it does so the phase and amplitude will vary with the other engines varying their operation to maintain synchronization of the power output amplitude and phase to match that of the master generator 20.

Depending on the number and wattage output of the linked generators the speed of each engine may vary. Because the generators are connected in parallel each generator sees the same load and each generator operates independently to generate power to meet that same load, at least up to the maximum load allowable by that generator. Thus, a 1000 watt generator will usually run faster than a 3,000 watt generator to generate the same load. A stepper motor (not shown) may be connected to the engine throttle and used to vary the engine speed so as to generate the appropriate power to meet the electrical load. But all linked generators share the load substantially equally, and as the phase and amplitude of the electrical output of each generator are the same the power from one generator does not cancel out or add to the electrical signal of another generator so as to create surges or dips in power. This holds true as the power demand decreases or increases.

When the load increases until one or more of the generators reaches its maximum output, then any generator having a greater wattage output will be operated at an increased speed up since it sees a higher load and will continue to increase its engine speed and power output until either the load is met or until its maximum power output is achieved, and so on until all four generators are operating at their maximum power output. For those generators operating at maximum output, a demand for an increased power output does not alter the engine performance since the generator can only output its maximum power. But as long as the power output of such generator is synchronized with the others it continues to contribute what it can to the total power demand as the generators are connected in parallel.

Referring to FIGS. 1 and 3, the power cables 30, 32, 34 and 36 are connected to a common parallel linkage box 28 which interconnects the generators 20, 22, 24, 26 and provides a higher amperage outlet or receptacle 52. It is impractical to run power cables directly between generators to connect them in parallel since the generators lack input connectors to receive power from another generator. Also, it makes no financial sense to put a high amperage outlet 52 on a generator that cannot generate the amperage for that outlet, and doing so will lead to overloading the generator if a high amperage load is connected to a high amperage outlet 52 when the generator cannot supply the required amperage. As shown in FIG. 3, the power transfer cables 30, 32, 34, 36 are connected in parallel. The communication cables 40, 42, 44 and 46 are shown as being connected in parallel.

Within the linkage box 28 the inputs from power cables 30, 32, 34 and 36 are connected to place the power from generators 20, 22, 24, and 26 in parallel so that the power available from each power outlet or receptacle 52 on the linkage box and generator is 120 V, but the wattage available at each receptacle is greater, and so that a higher amperage outlet 52 is available than with a single generator. Likewise, the communication cables 30, 34, 34 and 36 are connected so that each generator can identify the master and slave generators to synchronize operator to produce a power output with a consistent phase and signal.

The linkage box 28 is portable, meaning that a single, average male could lift and carry the box 28. Advantageously, the box 28 weighs less than about 100 pounds, and preferably weighs less than 50 pounds. It has at least two, and preferably at least three or four power connectors and the same number of communication connectors. It also has at least one power outlet 52 of higher amperage than normally found on the generators, preferably an outlet of at least 50 amps, and less preferably an outlet of at least 40 amps.

The box 28 is preferably configured to releasably fasten to the top or side of one of the generators 20, 22, 24, 26, and preferably is configured to fit between two similarly constructed generators. Thus, the box 28 may have recesses or protrusions on upper and/or its lower surface configured to fit over protruding portions of a generator below or above the box 28 or configured to fit into recesses of a generator below or above the box 28.

While four generators are used for illustration, the disclosures herein can be used with three generators. It is believed that more than four generators could be linked, and it is not believed to matter whether the number of linked generators is even or odd. It is preferred that the generators have the same rated power output, but the linkage system is believed to function with generators of different power output. The term different power outputs is not meant to encompass the slight power variations that may arise of generators built to the same specifications but which differ slightly in power output because of manufacturing differences. Rather, different power output means power output differences of at least 100 watts, and preferably differences of 400 watts or more.

The module 60 is preferably a software module embodied in computer code and causing a computer processor to perform the above described functions. The specific computer code is believed to be known to or readily developed by one skilled in the art having knowledge of the present disclosure. The module 60 may be embodied in firmware or computer memory of various forms and reference to software module 60 is intended to encompass all of these ways of storing and implementing the functions of the software module 60. The software module 60 may be referred to as a control module. The control module 60 of each slave generator varies the operation of the generator associated with that module so as to match the amplitude and phase of the master generator's output. Preferably the match is identical, but approximating the phase and amplitude within about 5% or less is believed suitable, with matching within about 2% or less being preferred—all when the linked generators are operating under a constant load in a stabilized operation mode.

The parallel connection achieved by the power cables, communication cables and linkage box 28 may be used with various generators. These parts may be provided together as a kit, with the purchaser or user providing the generators to be linked. The power cables, communication cables and linkage box 28 are believed to be especially useful with inverter generators of the same or different power output. These inverter generators contain a computer or process and software configured to run the engine at the lowest speed suitable to generate the power to meet the load on the generator. It is believed to be especially useful for linking inverter type generators of different power output since it allows the linked generators to run the engines at the speed needed to meet the load on the linked generators, thereby conserving fuel, reducing noise and reducing exhaust emissions from the engines powering the generators.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system of linked, portable generators for synchronized operation, comprising:
   at least first, second and third portable, engine driven, inverter generators, each generator having a separate control module configured to vary the amplitude of the generated voltage and the phase between the generated current and voltage;
   a linkage box connected to the at least first, second and third generators to receive power output from those generators and to connect those power outputs in parallel, the linkage box having at least one receptacle in electrical communication with the parallel power output;
   a communication cable extending between and separately linking the linkage box to each of the at least first, second and third generators and the control module associated with each of those generators so as to place the control modules in communication with the linkage box and with at least the output of the control module of the first generator which outputs the amplitude and phase of the power output of the first generator, the control modules of the at least second and third generators configured to synchronize the operation of the generator associated with the control module to the operation of the first generator so as to generate an AC output with a voltage amplitude and phase like that of the first generator.

2. The system of claim 1, wherein there are three or four generators and the same number of communication cables with the communication cables connected in parallel by the linkage box.

3. The system of claim 1, wherein there are three or four generators and the same number of communication cables with the communication cables interconnected by the linkage box.

4. The system of claim 2, wherein the outlet on the linkage box has an amperage greater than that of any outlet on any of the linked generators.

5. The system of claim 2, wherein at least one of the generators has a different maximum power output than the other generators.

6. A method for synchronizing three or more portable, engine powered, inverter generators, the generators having a control module configured to vary the amplitude of the generated voltage and the phase between the generated current and voltage, comprising:

connecting a power output of each generator to a linkage box which connects the power outputs in parallel;

placing an electrical outlet on the linkage box in electrical connection with the parallel power output of the generators connected in parallel;

placing the control module of each generator in communication with the linkage box and with at least the control module in the first generator;

configuring the control modules of the at least second and third generators to synchronize the operation of the generator associated with those control modules to the operation of the first generator in response to signals provided by the first control module, so that each at least second and third generators generate an AC output with a voltage amplitude and phase like that of the first generator.

7. The method of claim 6, wherein at least one of the generators has a different maximum power output than the other generators.

* * * * *